United States Patent
Yamasaki et al.

(10) Patent No.: US 7,329,341 B2
(45) Date of Patent: Feb. 12, 2008

(54) WASTEWATER TREATMENT DEVICE

(75) Inventors: Kazuyuki Yamasaki, Hiroshima (JP);
Keichiro Uda, Souraku-gun (JP);
Kazumi Chuhjoh, Ayauta-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 23 days.

(21) Appl. No.: 11/356,572

(22) Filed: Feb. 17, 2006

(65) Prior Publication Data

US 2006/0191847 A1 Aug. 31, 2006

(30) Foreign Application Priority Data

Feb. 28, 2005 (JP) .............................. 2005-053649

(51) Int. Cl.
*B01D 31/70* (2006.01)

(52) U.S. Cl. ...................... 210/150; 210/151; 210/220; 210/252; 210/245

(58) Field of Classification Search ................ 210/150, 210/151, 220, 252, 295
See application file for complete search history.

(56) References Cited

U.S. PATENT DOCUMENTS 6,592,755 B1* 7/2003 Nurse, Jr. .................... 210/150
6,887,383 B2* 5/2005 Potts .......................... 210/620
6,946,073 B2* 9/2005 Daigger et al. ............. 210/605

FOREIGN PATENT DOCUMENTS

| CN | 86206538 | 7/1987 |
|---|---|---|
| JP | 3095620 B2 | 10/2000 |
| JP | 2000-308900 | 11/2000 |
| JP | 2001-334275 | 12/2001 |
| JP | 2003-334548 | 11/2003 |
| JP | 3467671 B2 | 11/2003 |
| JP | 2004-121962 | 4/2004 |
| JP | 2004-237144 | 8/2004 |
| JP | 2004-249252 | 9/2004 |
| WO | 2004/106240 | 12/2004 |

* cited by examiner

Primary Examiner—Chester T. Barry
(74) Attorney, Agent, or Firm—Renner, Otto, Boisselle & Sklar, LLP (57) ABSTRACT

A wastewater treatment device treats nitrogen wastewater containing hydrogen peroxide by using micro/nano bubbles generated in a micro/nano bubble reaction tank. Thereby, activity of microbes is increased in next denitrification tank and nitrification tank, so that microbial treatment efficiency can be increased and the denitrification tank and the nitrification tank can be downsized. Thus, the wastewater treatment device makes it possible to enhance treatment efficiency of nitrogen wastewater containing hydrogen peroxide and to reduce initial and running costs for wastewater treatment.

14 Claims, 6 Drawing Sheets

NITROGEN CONCENTRATION : 2000ppm, HYDROGEN PEROXIDE CONCENTRATION : 10ppm

| TANK NAME | RESIDENCE | TIMING |  |  |  |  |  |  |  |
|---|---|---|---|---|---|---|---|---|---|
|  |  | 0.5 DAY | 1 DAY | 1.5 DAY | 2 DAY | 2.5 DAY | 3 DAY | 3.5 DAY | 4 DAY |
| NITROGEN CONCENTRATION 2000ppm, HYDROGEN PEROXIDE CONCENTRATION 10ppm | — | — |  |  |  |  |  |  |  |
| ADJUSTMENT TANK | 0.5 DAY |  | — |  |  |  |  |  |  |
| MICRO NANO BUBBLE REACTION TANK | 0.2 DAY |  |  | — |  |  |  |  |  |
| DENITRIFICATION TANK | 1 DAY |  |  | —————— |  |  |  |  |  |
| NITRIFICATION TANK | 2 DAY |  |  |  | ———————————————— |  |  |  |  |

Fig.5B

NITROGEN CONCENTRATION : 4000ppm, HYDROGEN PEROXIDE CONCENTRATION : 20ppm

| TANK NAME | RESIDENCE | TIMING |  |  |  |  |  |  |  |
|---|---|---|---|---|---|---|---|---|---|
|  |  | 1 DAY | 2 DAY | 3 DAY | 4 DAY | 5 DAY | 6 DAY | 7 DAY | 8 DAY |
| NITROGEN CONCENTRATION 4000ppm, HYDROGEN PEROXIDE CONCENTRATION 20ppm | — | — |  |  |  |  |  |  |  |
| ADJUSTMENT TANK | 0.5 DAY | — |  |  |  |  |  |  |  |
| MICRO NANO BUBBLE REACTION TANK | 0.2 DAY | — |  |  |  |  |  |  |  |
| DENITRIFICATION TANK | 2 DAY |  | ─── | ─── |  |  |  |  |  |
| NITRIFICATION TANK | 4 DAY |  |  |  | ─── | ─── | ─── | ─── |  |

WASTEWATER TREATMENT DEVICE

CROSS-REFERENCE TO RELATED APPLICATIONS

This nonprovisional application claims priority under 35 U.S.C. §119(a) on Patent Application No. 2005-053649 filed in Japan on 28 Feb. 2005, the entire contents of which are incorporated herein by reference.

BACKGROUND OF THE INVENTION

The present invention relates to a wastewater treatment device and a wastewater treatment method. The present invention relates to, as an example, a wastewater treatment device and a wastewater treatment method allowing advanced treatment of high concentration nitrogen wastewater containing hydrogen peroxide (e.g., high concentration ammonium-bearing wastewater containing hydrogen peroxide) discharged mainly from semiconductor plants as well as nitrogen contained in aminoethanol-bearing wastewater in compliance with the total volume control of nitrogen in conformity to partial amendments to Water Pollution Control Law implemented as of April 2004 while allowing energy saving and reduction in initial costs, running costs and maintenance costs.

Conventionally, it has been impossible in general to apply microbial treatment to high concentration nitrogen wastewater such as wastewater containing high concentration ammonium of approximately 3000 ppm since high organism toxicity.

Therefore, generally, the microbial treatment has been applied to nitrogen-bearing wastewater of low ammonium concentrations as low as several hundred ppm.

Accordingly, the wastewater containing high concentration ammonium of more than 3000 ppm has been concentrated to about 1/10 with use of an evaporator as a physical method. The resultant concentrated solutions have been placed as industrial wastes. In the method of concentrating the wastewater with use of the evaporator and discharging them as industrial wastes from plants, the concentrated solutions were deemed as industrial wastes. Therefore, this method has caused increase in industrial wastes from factories and caused problems such as air pollution due to use of fuel such as heavy oil because the concentrated solutions have generally been disposed as industrial waste by incineration. Moreover, the treatment method using the evaporator consumes a large quantity of energy and involves large plant equipment. This has caused a disadvantage of large initial costs, running costs and maintenance costs.

As another prior art, a biological treatment method has been disclosed in JP 2000-308900 A. The biological treatment in this prior art makes it possible to achieve stable treatment by preventing degradation of treatment efficiency caused by nitrite-nitrogen which is generated during treatment of wastewater containing high concentration ammonium-nitrogen. More specifically, the biological treatment method uses biological denitrification process involving autotrophic bacteria resistant to nitrite-nitrogen, in which the nitrite-nitrogen is removed from the wastewater by reducing the nitrite-nitrogen to nitrogen gas.

In the treatment method for ammonium-bearing wastewater, a nitrification tank, a denitrification tank, a UV oxidation tank, and treatments in the nitrification tank, a photocatalytic UV oxidation tank, the denitrification tank and the UV oxidation tank are disclosed.

A different biological treatment method is disclosed in JP 3467671 B2 as another prior art.

The biological treatment method is a nitrification-denitrification method in which organic wastewater in a raw water tank is sequentially fed to a denitrification tank and a nitrification tank with use of a feeding pump and circulated between both the tanks. Thereby, ammonia-state nitrogen contained in the organic wastewater is reduced to nitrogen gas by biological nitrification and denitrification actions. Further, sludge and treated water are separated from each other by using a suction pump and a filtration film unit sunk into wastewater in the nitrification tank.

A feature of the nitrification and denitrification method is that a pipe from the denitrification tank to the nitrification tank diverges in some midpoint, and an end of a diverging section is opened to the denitrification tank so that part of organic wastewater fed from the denitrification tank to the nitrification tank is ejected to the organic wastewater in the denitrification tank. That is to say, in this nitrification and denitrification method, wastewater is sequentially fed with use of the feeding pump to the denitrification tank and the nitrification tank while being circulated between both the tanks.

As yet another prior art, another biological treatment method is disclosed in JP 3095620-B.

In this biological treatment method, treatment is performed by a biological nitrogen rejection apparatus. The biological nitrogen rejection apparatus is provided with a denitrification tank for receiving inflow of raw water containing organic matters, a nitrification tank for receiving inflow of denitrification tank mixtures from the denitrification tank, a nitrified liquid circulation channel for circulating a nitrified liquid of the nitrification tank to the denitrification tank, and a nitrification tank air diffuser placed inside the nitrification tank.

More specifically, the biological nitrogen rejection apparatus has a denitrifying bacteria immobilization support charging zone placed in the denitrification tank in order to catch and remove suspended solids in the raw water flowing into the denitrification tank. Moreover, a raw water induction channel and a nitrified liquid circulation channel are linked to a lower position of the denitrifying bacteria immobilization support charging zone in the denitrification tank. Also, a sludge hopper section, which is for accumulating the suspended solids caught and removed in the denitrifying bacteria immobilization support charging zone, is provided on the bottom section of the denitrification tank, and a hopper air diffuser is provided in the sludge hopper section.

However, microbial treatment has not generally been applied to wastewater containing high concentration ammonium at about approximately 3000 ppm due to its high organism toxicity, as described above. More particularly, the high concentration ammonium wastewater which is too high in organism toxicity to undergo microbial treatment has been treated by the concentration method or the vaporization separation method. Accordingly, the concentration method has such problems as heavy consumption of energy and increase in industrial wastes caused by concentrated solutions, whereas the vaporization separation method has drawbacks such as inability to treat nitrous acid and nitric acid except ammonium in addition to heavy consumption of energy.

As yet another prior art, treatment method and device using nano-bubbles (bubble of diameter less than 1 μm) are disclosed in JP 2004-121962 A.

This prior art utilizes such characteristics of nano-bubbles as decrease in buoyancy, increase in surface area, increase in surface activity, generation of local high pressure fields, a surface active property and an antiseptic property attained by achievement of electrostatic polarization. More specifically, the prior art JP 2004-121962 A has disclosed that associating the above-stated characteristics with each other allows nano-bubbles to obtain a fouling component adsorption function, a substance surface high-speed cleaning function and an antiseptic function, and therefore, to effectively clean various substances with low environmental load and purify contaminated water Still another prior art JP 2003-334548-A discloses a nano-bubble generation method.

This prior art has disclosed a process (1) for gasifying part of liquid by decomposition, a process (2) for applying ultrasonic waves to liquid, and a process (3) for gasifying part of liquid by decomposition with applying ultrasonic waves to liquid.

The two above-stated prior arts have disclosed the use of nano-bubbles for purification of contaminated water and removal of dirt on the surface of solids, but have not yet disclosed a technology for improving the efficiency of treatment and the quality of treated water when nitrogen containing wastewater is treated with microbes.

SUMMARY OF THE INVENTION

An object of the present invention is to provide a wastewater treatment method and a wastewater treatment device allowing increase in treatment efficiency of nitrogen wastewater containing hydrogen peroxide while achieving downsizing and reduction in running cost.

In order to achieve the bove-mentioned object, the present invention provides a wastewater treatment method, comprising:

a micro/nano bubble treatment step for treating nitrogen wastewater containing hydrogen peroxide with use of micro/nano bubbles; and a microbial treatment step for applying microbial treatment with use of a submerged membrane to treated water that is treated in the micro/nano bubble treatment step.

According to the wastewater treatment method in the present invention, treating nitrogen wastewater containing hydrogen peroxide with use of micro/nano bubbles makes it possible to increase activity of microbes in the next microbial treatment step so as to enhance treatment efficiency. This makes it possible to downsize a treatment tank used in the microbial treatment step. Therefore, according to the present invention, it becomes possible to enhance treatment efficiency of nitrogen wastewater while reducing initial costs as well as running costs for wastewater treatment.

Description is now given of three kinds of bubble.

(i) normal bubbles rise in water to end up bursting on the surface and disappear.

(ii) micro bubbles, which are fine bubbles with a diameter of 50 microns (μm) or less, shrink in water and end up disappearing (completely dissolving).

(iii) nano bubbles, which are smaller than micro bubbles and have a diameter of several hundred nm or less (e.g., diameter of 100 to 200 nm), are said to be able to keep on existing in water on a permanent basis.

Accordingly, the term "micro/nano bubble" herein refers to a bubble which is a mixture of the micro bubble and the nano bubble.

The present invention also provides a wastewater treatment device, comprising:

a micro/nano bubble reaction tank for receiving nitrogen wastewater containing hydrogen peroxide and treating the nitrogen wastewater with use of micro/nano bubbles;

a denitrification tank for receiving treated water from the micro/nano bubble reaction tank; and a nitrification tank for receiving treated water from the denitrification tank and applying microbial treatment to the treated water with use of a submerged membrane provided in the nitrification tank.

According to the wastewater treatment device in the invention, treating nitrogen wastewater containing hydrogen peroxide in the micro/nano bubble reaction tank with use of micro/nano bubbles makes it possible to increase activity of microbes in the next denitrification tank and the nitrification tank, so that treatment efficiency is enhanced and the denitrification tank and the nitrification tank can be downsized. Accordingly, it becomes possible to enhance the treatment efficiency of the nitrogen wastewater while reducing initial costs and running costs for wastewater treatment.

In an embodiment of the present invention, the wastewater treatment device further comprises an adjustment tank placed before the micro/nano bubble reaction tank, receiving the nitrogen wastewater, and adjusting quality and quantity of the nitrogen wastewater, wherein the micro/nano bubble reaction tank receives nitrogen wastewater whose quality and quantity are adjusted in the adjustment tank.

According to the wastewater treatment device in the embodiment, the micro/nano bubble reaction tank receives nitrogen wastewater with quality and quantity adjusted in the adjustment tank, which allows nitrogen wastewater treatment with micro/nano bubbles to be performed efficiently.

In an embodiment of the present invention, the micro/nano bubble reaction tank has a micro/nano bubble generator, and a feed section is provided for feeding treated water attained from the nitrification tank through the submerged membrane to the micro/nano bubble generator.

According to the wastewater treatment device in the embodiment, the feeding section feeds treated water from the nitrification tank through the submerged membrane to the micro/nano bubble generator provided in the micro/nano bubble reaction tank. In other words, the feeding section feeds water (water containing electrolyte) treated by submerged membrane to the micro/nano bubble generator, wherein the treated water derives from the nitrification tank which is a high concentration biological device using a submerged membrane. Consequently, the micro/nano bubble generator can stably and efficiently supply extremely fine bubbles (micro/nano bubbles) in the micro/nano bubble reaction tank.

In an embodiment of the present invention, the nitrification tank has a micro/nano bubble cleaning section for generating micro/nano bubbles to clean the submerged membrane.

According to the wastewater treatment device in the embodiment, the surface of the submerged membrane is cleaned with micro/nano bubbles generated by the micro/nano bubble cleaning section. This makes it possible to prevent such drawback as decrease in the quantity of water filtrated by the submerged membrane with lapse of operating time, and to secure the filtration water volume.

In an embodiment of the present invention, the nitrification tank has an air diffusing pipe for discharging air to the submerged membrane to clean the submerged membrane, and the submerged membrane is cleaned with mixed bubbles composed of micro/nano bubbles generated by the micro/nano bubble cleaning section and air discharged from the air diffusing pipe.

According to the wastewater treatment device in the embodiment, bubbles of two kinds, which are micro/nano bubbles generated by the micro/nano bubble cleaning section and large air bubbles discharged from the air diffusing pipe, can be mixed to clean the submerged membrane in the nitrification tank. Therefore, synergistic effects of these two kinds of bubbles attained by fulfillment of both the characteristics of these two kinds of bubbles can be expected and this allows more reliable cleaning of the submerged membrane. More particularly, air bubbles from the air diffusing pipe move toward the submerged membrane so that micro/nano bubbles excellent in cleaning effect can be introduced to the submerged membrane.

In an embodiment of the present invention, the air diffusing pipe is placed below the submerged membrane while the micro/nano bubble cleaning section is placed between the submerged membrane and the air diffusing pipe, a first guide is mounted on the air diffusing pipe and guiding air discharged from the air diffusing pipe to the micro/nano bubble cleaning section; and a second guide is mounted on the submerged membrane and guiding micro/nano bubbles generated by the micro/nano bubble cleaning section and air discharged from the air diffusing pipe to the submerged membrane.

According to the wastewater treatment device in the embodiment, the first guide and the second guide can laconically bring the micro/nano bubbles generated by the micro/nano bubble cleaning section and air bubbles generated by the air diffusing pipe into contact with the submerged membrane. This allows more reliable cleaning of the submerged membrane.

In an embodiment of the present invention, the nitrification tank has a plurality of submerged membranes placed vertically in two or more stages.

According to the wastewater treatment device in the embodiment, submerged membranes placed vertically in two or more stages in the nitrification tank can be cleaned with only the quantity of air necessary for the lowermost submerged membrane. Therefore, the air quantity necessary for cleaning can be reduced drastically. Moreover, a plurality of the submerged membranes are placed in two or more stages in vertical direction in the nitrification tank, which makes it possible to reduce the nitrification tank mounting flow area and to provide a space saving device.

In an embodiment of the present invention, the micro/nano bubble reaction tank receives mixed wastewater composed of the nitrogen wastewater and aminoethanol-containing wastewater.

According to the wastewater treatment device in the embodiment, aminoethanol-containing wastewater can be used as a hydrogen donor during denitrification of nitrogen in an nitrogen wastewater containing hydrogen peroxide. Therefore, compared to the case of using methanol as a hydrogen donor, chemical costs can be reduced.

In an embodiment of the present invention, the denitrification tank has an upper section, a lower section, a separation wall placed between the upper section and the lower section, a divider plate extending in vertical direction, and an air diffusing pipe placed between the divider plate and the separation wall, and the nitrification tank has an upper section, a lower section, a separation wall placed between the upper section and the lower section, a divider plate extending in vertical direction, and an air diffusing pipe placed between the divider plate and the separation wall.

According to the wastewater treatment device in the embodiment, in the denitrification tank and the nitrification tank, a water stream is generated along the divider plate based on an air lift principle due to combination of the divider plate and the air diffusing pipe. Consequently, treated water is agitated even if an MLSS concentration of treated water is 15000 ppm or more in the denitrification tank and the nitrification tank.

In an embodiment of the present invention, the denitrification tank receives treated water subjected to biological treatment and/or sludge generated after biological treatment.

According to the wastewater treatment device in the embodiment, the denitrification tank receives treated water subjected to biological treatment or sludge generated after the biological treatment, which makes it possible to reinforce the activity of microbes in the denitrification tank. More particularly, culturing high concentrations of microbes requires minerals in treated water subjected to biological treatment or in sludge generated after the biological treatment. Shortage of the minerals causes poor activity of microbes. Moreover, electrolyte-rich treated water is obtained by guiding the treated water subjected to biological treatment and/or sludge resulting from the biological treatment into the denitrification tank, because the treated water and the sludge are sources of electrolyte ions.

In an embodiment of the present invention, a microbe concentration in the nitrification tank is 15000 ppm or more in mixed liquor suspended solid concentration.

According to the wastewater treatment device in the embodiment, it becomes possible to apply microbial treatment to hydrogen peroxide, although hydrogen peroxide is biocidal to microbes and also ammonium-nitrogen is biologically toxic to microbes. This is because a microbe concentration of treated water in the nitrification tank is as high as 15000 ppm or more in MLSS concentration.

According to a wastewater treatment method in the present invention, nitrogen wastewater containing hydrogen peroxide is treated with micro/nano bubbles, so that microbial treatment efficiency in the next microbial treatment step can be enhanced and a treatment tank for use in the microbial treatment step can be downsized. Therefore, according to the present invention, it becomes possible to enhance treatment efficiency of nitrogen wastewater, and reduce initial costs and running costs for wastewater treatment.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Hereinbelow, the present invention will be described in detail in conjunction with the embodiments with reference to the drawings.

First Embodiment

Figure 1:
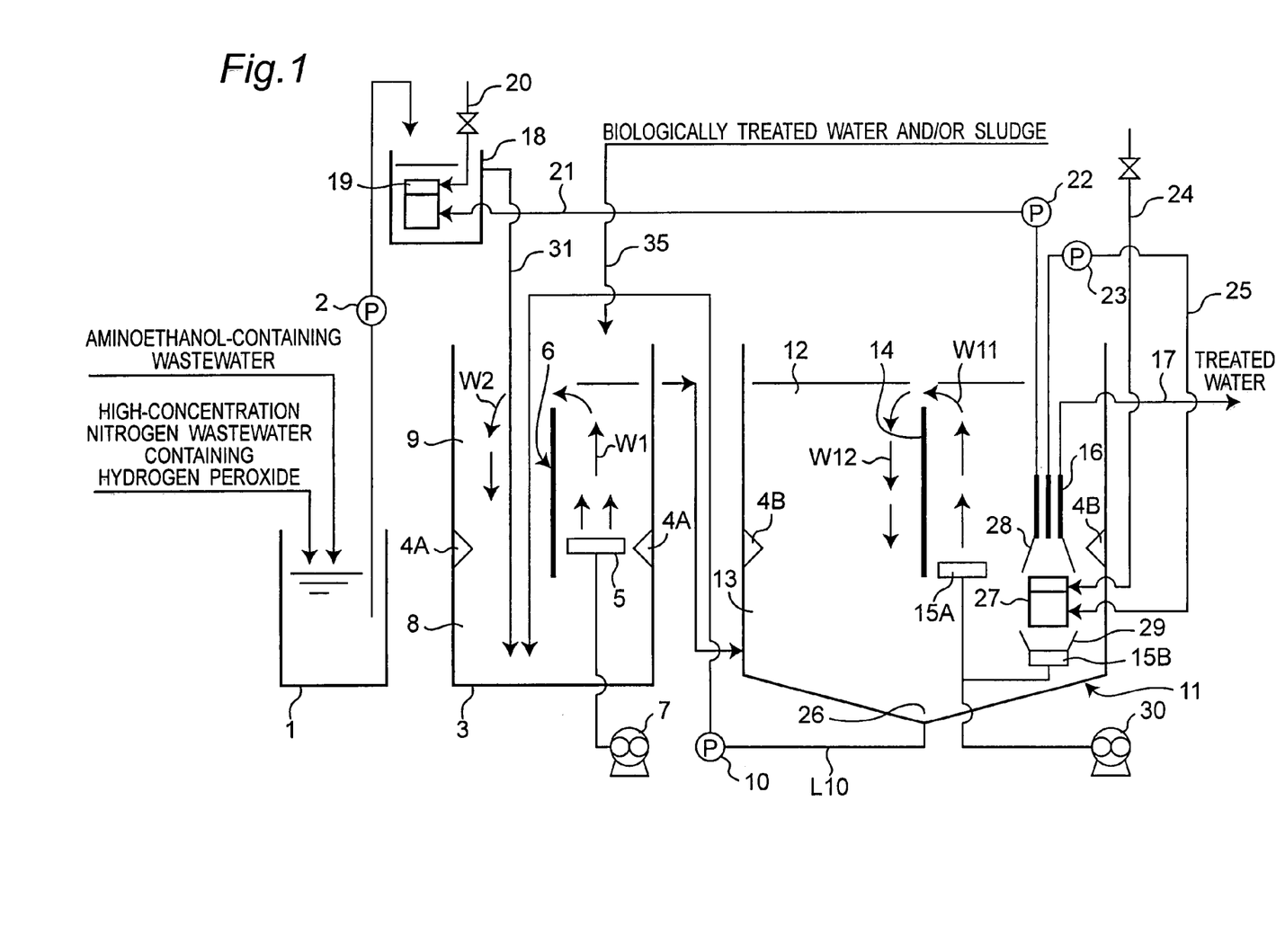
FIG. 1 is a schematic view showing a wastewater treatment device in a first embodiment of the present invention.

FIG. 1 is a schematic view showing a wastewater treatment device in a first embodiment of the present invention. The wastewater treatment device in the first embodiment is composed of an adjustment tank 1, a micro/nano bubble reaction tank 18, a denitrification tank 3 and a nitrification tank 11.

High-concentration nitrogen wastewater containing hydrogen peroxide and aminoethanol-containing wastewater are introduced into the adjustment tank 1. In the adjustment tank 1, the quantity and the quality of each introduced wastewater are adjusted. The wastewater introduced into the adjustment tank 1 include, for example, high-concentration nitrogen wastewater containing hydrogen peroxide and aminoethanol-containing wastewater generated during CMP (Chemical Mechanical Polishing) step in semiconductor plants. The high-concentration nitrogen wastewater containing hydrogen peroxide includes a wastewater containing high concentration ammonium and containing hydrogen peroxide.

Guiding aminoethanol-containing wastewater into the adjustment tank 1 makes it possible to treat not only aminoethanol that is a toxic substance but also nitrogen in the aminoethanol in the next denitrification tank 3, and further enables the aminoethanol to be used as a hydrogen donor. Consequently, chemical agent costs can be saved in comparison with the case of using methanol as a hydrogen donor in the denitrification tank 3. Moreover, the adjustment tank 1 is provided with an adjustment tank pump 2. The adjustment tank pump 2 pumps treated water into the micro/nano bubble reaction tank 18 from the adjustment tank 1.

In the micro/nano bubble reaction tank 18, a micro/nano bubble generator 19 is placed. An air suction pipe 20 and a treated water feed pipe 21 are connected to the micro/nano bubble generator 19. Through the air suction pipe 20 and the feed pipe 21, air and treated water are introduced into the micro/nano bubble generator 19. The micro/nano bubble generator 19 generates micro/nano bubbles from the introduced air and treated water. As the micro/nano bubble generator 19, any micro/nano bubble generator available in the market can be used regardless of manufacturers. For example, a micro/nano bubble generator made by Nanoplanet Research Institute Corporation can be adopted. As the micro/nano bubble generator 19, it is also acceptable to select a micro bubble generator made by SEIKA CORPORATION and convert it to a generator to generate micro bubbles.

In the micro/nano bubble reaction tank 18, ammonium-nitrogen and nitrite-nitrogen in high concentration nitrogen wastewater containing hydrogen peroxide are oxidized by micro/nano bubbles and a part of them is converted to nitrate-nitrogen in a short period of time. Treated water oxidized by micro/nano bubbles, which are generated by the micro/nano bubble generator 19 incorporated in the micro/nano bubble reaction tank 18, is introduced to a lower section 8 of the denitrification tank 3 through a pipe 31.

The denitrification tank 3 receives not only treated water from the micro/nano bubble reaction tank 18 but also treated water through a pipe 35 whose water has been subjected to biological treatment or sludge generated after the biological treatment. Activity of all the microbes in the denitrification tank 3 and the nitrification tank 11 is promoted by microelements such as phosphorus, potassium, calcium and magnesium contained in the treated water subjected to biological treatment and the sludge generated after the biological treatment. In the nitrification tank 11, in particular, activity of microbes is promoted by the microelements contained in the treated water, and treatment by microbes is stabilized because the microbe high-concentration microbial treatment is performed in treated water with use of a placed submerged membrane 16. Moreover, it becomes possible to suppress stimulation given by the treated water to the microbes in the lower section 8. This is because the treated water from the micro/nano bubble reaction tank 18 is introduced to the lower section 8 of the denitrification tank 3 where a microbe concentration is high due to gravity. Thus, treatment by microbes is stabilized.

Moreover, a separation wall 4A is mounted on a inner wall of the denitrification tank 3 and defines a boundary between an upper section 9 and the lower section 8. In the denitrification tank 3, a divider plate 6 extending in vertical direction is also placed in almost the lateral center of the tank. An air diffusing pipe 5 is placed between the divider plate 6 and the separation wall 4A. The air diffusing pipe 5 is connected to a denitrification tank blower 7. In the denitrification tank 3, an air lift effect is attained by combination of the divider plate 6 and the air diffusing pipe 5. More particularly, air bubbles discharged from the air diffusing pipe 5 generate a water stream along the divider plate 6. More particularly, in the denitrification tank 3 shown in FIG. 1, ascending stream W1 is generated in an area on the right side of the divider plate 6 where the air diffusing pipe 5 is placed, whereas descending stream W2 is generated in an area on the left side of the divider plate 6. Thereby, agitation can be performed in the denitrification tank 3 even if MLSS (Mixed Liquor Suspended Solid) concentration of treated water is 15000 ppm or more. More particularly, the divider plate 6 and the air diffusing pipe 5 are placed in the denitrification tank 3 so as to prevent generation of so-called dead space, which is an area out of agitation reach, and to agitate the entire area in the denitrification tank 3 by the air lift method.

It is to be noted that the denitrification tank blower 7 basically employs intermittent operation in which desired settings are achieved by a timer and the like.

Since the separation wall 4A is placed on the lateral wall of the denitrification tank 3, agitation by the air lift effect takes place more smoothly in the upper section 9 of the denitrification tank 3 than the lower section 8 thereof. Though some degree of agitation is necessary in the lower section 8 of the denitrification tank 3, agitation in the lower section 8 should be less frequent than that in the upper section 9 of the denitrification tank 3. This is because in the lower section 8 of the denitrification tank 3 the microbes are concentrated in high levels by natural settling.

High concentration return sludge containing microbes is introduced in large amounts into the lower section 8 of the denitrification tank 3 from a lower hopper section 26 of a semi-anaerobic section 13 of the nitrification tank 11. Specifically the high concentration return sludge is introduced into the lower section 8 of the denitrification tank 3 through a return pipe L10 connected to the lower hopper section 26 by using a return sludge pump 10. The return pipe L10 and the return sludge pump 10 forms a return section which allows semi-anaerobic sludge in the semi-anaerobic section 13 on the lower side of the nitrification tank 11 to be moved to the lower section 8 of the denitrification tank 3 without being exposed to oxygen in the air.

The high concentration nitrogen wastewater introduced into the lower section 8 of the denitrification tank 3 is anaerobically treated with aminoethanol in the aminoethanol-containing wastewater as an hydrogen donor. Thereafter, the wastewater flows to the upper section 9 of the denitrification tank 3, and then, by natural fall from the upper section 9, the wastewater is introduced to the semi-anaerobic section 13 located on the lower side of the nitrification tank 11.

The nitrification tank 11 has an upper aerobic section 12 and the lower semi-anaerobic section 13. The nitrification tank 11 also has a separation wall 4B mounted on the inner wall of the tank. The separation wall 4B defines a boundary between the aerobic section 12 and the semi-anaerobic section 13. Submerged membranes 16 are placed in the aerobic section 12. The nitrification tank 11 also has a divider plate 14 extending in vertical direction in a lateral central section inside the tank. The divider plate 14 is present over an almost upper half of the tank in vertical direction. The submerged membranes 16 are placed in a right-side area of the divider plate 14 in FIG. 1. One of the submerged membranes 16 is connected to a gravity pipe 17 for deriving treated water. An air diffusing pipe 15A is placed between the submerged membrane 16 and the divider plate 14, and connected to a nitrification tank blower 30. The air lift effect is generated by combination of the air diffusing pipe 15A and the divider plate 14. Air discharged from the air diffusing pipe 15A generates a water stream along the divider plate 14. More particularly, in the nitrification tank 11 shown in FIG. 1, ascending stream W11 is generated in an area on the right side of the divider plate 6, whereas descending stream W12 is generated in an area on the left side of the divider plate 6. Therefore, agitation can be performed in the nitrification tank 11 even if MLSS concentration of treated water is 15000 ppm or more.

Since the submerged membranes 16 are placed in the nitrification tank 11, microbes in the treated water are either left in the nitrification tank 11 or returned to the lower section 8 of the denitrification tank 3 with use of the return sludge pump 10. The return sludge is transferred to the lower section 8 of the denitrification tank 3 by the normal return sludge pump 10. Thereby, a large amount of return sludge can be transferred without being exposed to the air, which makes it possible to reliably maintain anaerobic state of the return sludge.

From one of the submerged membranes 16, treated water is sent out through the gravity pipe 17. Treated water from another submerged membrane 16 is also fed to the micro/nano bubble generator 19 in the micro/nano bubble reaction tank 18 through a feed pump 22 and a feed pipe 21. Still another submerged membrane 16 is connected to a feed pump 23 and a feed pipe 25 which are connected to a micro/nano bubble generator 27 placed below this submerged membrane 16. Therefore, the treated water from the submerged membrane 16 is introduced into the micro/nano bubble generator 27 through the feed pump 23 and the feed pipe 25. An air suction pipe 24 is connected to the micro/nano bubble generator 27 for feeding air.

In the meanwhile, the microbe sludge is returned by the return sludge pump 10 from the lower hopper section 26 of the semi-anaerobic section 13 to the lower section 8 of the denitrification tank 3. Then, the microbe sludge is returned again to the semi-anaerobic section 13 in the nitrification tank 11 through the upper section 9 of the denitrification tank 3. Thereby, the microbe sludge circulates. Circulation of the microbe sludge between both the tanks maintains the microbe concentration in both the tanks at almost the same level. On the other hand, in the case where the microbe concentration is as high as 15000 ppm or more in MLSS (Mixed Liquor Suspended Solid) concentration, a dead space beyond agitation reach would be generated when the waste water is agitated by a general agitator, an underwater agitator or a circulating pump. In the present embodiment, however, the combination of the divider plate 14 and the air diffusing pipe 15A generates a water stream along the divider plate 14, which agitates the entire area of the tank by the air lift method. This prevents generation of the dead space beyond agitation reach.

Moreover, the separation wall 4B is also placed on the lateral wall of the nitrification tank 11. Therefore, agitation takes place more smoothly in the aerobic section 12 than the semi-anaerobic section 13. Though some degree of agitation is necessary in the semi-anaerobic section 13, agitation in the semi-anaerobic section 13 should be less frequent than that in the aerobic section 12. This is because microbes are concentrated in high levels by natural settling in the semi-anaerobic section 13. Thus, the microbe concentration in both the denitrification tank 3 and the nitrification tank 11 is maintained at 15000 ppm or more in MLSS (Mixed Liquor Suspended Solid).

A submerged membrane cover 28 is mounted on the submerged membranes 16 as a second guide. The submerged membrane cover 28 makes it possible to gather and ascend in a cluster the micro/nano bubbles generated by the micro/nano bubble generator 27. Thereby, the submerged membranes 16 are efficiently cleaned. An air diffusing pipe 15B is also placed below the micro/nano bubble generator 27. The air diffusing pipe 15B is connected to the nitrification tank blower 30. The air diffusing pipe 15B is provided with an air diffusing pipe cover 29 as a first guide. The air diffusing pipe cover 29 allows air, which is fed from the nitrification tank blower 30 and discharged from the air diffusing pipe 15B, to efficiently hit at the submerged membrane 16 through the micro/nano bubble generator 27 placed above. This further increases the cleaning effect of the submerged membrane 16.

The micro/nano bubble generator 27 and the nitrification tank blower 30 for cleaning the submerged membrane 16 may be operated independently or concurrently. When both the generator 27 and the blower 30 are operated concurrently, the cleaning effect is further increased by both the air bubbles from the air diffusing pipe 15B and the micro/nano bubbles generated by the micro/nano bubble generator 27. A choice of operation modes to be selected should be determined on the basis of observing the state of the submerged membrane 16.

Back to the description of the denitrification tank 3, an oxidation-reduction potentiometer (unshown) is placed in the denitrification tank 3 for measurement of the degree of anaerobiotic. Nitrate-nitrogen in the treated water is introduced from the semi-anaerobic section 13 of the nitrification tank 11 to the denitrification tank 3 by the return sludge pump 10. Then, nitrate-nitrogen in the treated water is reduced to nitrogen gas by anaerobic microbes under the presence of aminoethanol that is a hydrogen donor. It should be noted that the nitrate-nitrogen in the treated water is nitrate-nitrogen into which microbes have dissolved and changed high concentration ammonium wastewater containing hydrogen peroxide or aminoethanol, as high concentration nitrogen wastewater containing hydrogen peroxide, in the micro/nano bubble reaction tank 18 and the aerobic section 12 of the nitrification tank 11.

Moreover, in the denitrification tank 3, organic substances other than aminoethanol are biologically dissolved by anaerobic microbes. Next, the treated water flowing from the denitrification tank upper section 9 in the denitrification tank 3 is introduced into the semi-anaerobic section 13 on the lower side of the nitrification tank 11 as described above. It is herein defined that the anaerobic section is in the state that no dissolved oxygen is present, the aerobic section is in the state that a dissolved oxygen level is maintained at several ppm, and the semi-anaerobic section is in the state that the dissolved oxygen level between 0 ppm and 0.5 ppm.

In the aerobic section 12 on the upper side of the nitrification tank 11, the water stream is generated by air discharged from the air diffusing pipe 15A. However, the separation wall 4B, which is placed in the nitrification tank 11, makes the water stream to less influence the lower semi-anaerobic section 13 than the aerobic section 12 although the water stream has some influence on the lower semi-anaerobic section 13. High microbe concentration in the nitrification tank 11 minimizes the influence of the water stream in the aerobic section 12 on the semi-anaerobic section 13 even though the size of the separation wall 4B is as shown in FIG. 1.

Moreover in the present embodiment, the semi-anaerobic section 13 is placed on the lower side of the nitrification tank 11 in the circulation system having the return sludge pump 10 and the return pipe L10 that are placed between the denitrification tank 3 and the nitrification tank 11. Therefore, anaerobic microbes moving to the nitrification tank 11 together with the treated water, which has been treated by anaerobic microbes in the denitrification tank 3, are not directly introduced into the aerobic section 12 but introduced into the aerobic section 12 through the semi-anaerobic section 13. This makes it possible to decrease environmental stress on the anaerobic microbes moving to the nitrification tank 11. Less environmental stress on the anaerobic microbes increases the treatment efficiency in treating nitrogen.

Moreover, in the semi-anaerobic section 13 of the nitrification tank 11, peculiar microbes breed. Therefore, wastewater is treated not only by anaerobic and aerobic microbes but also by various microbes breeding in the semi-anaerobic section 13. This makes it possible to comprehensively enhance efficiency of microbial treatment. Moreover, it was found out that the microbes which breed in the semi-anaerobic section 13 contribute to reduction of sludge. Moreover, the semi-anaerobic section 13 is not aerated since it is not equipped with an air diffusing pipe as aerating equipment. However, the semi-anaerobic section 13 is affected to some degree by the water stream in the aerated aerobic section 12 on the upper side of the semi-anaerobic section 13. The condition of the semi-anaerobic section is that the dissolved oxygen level is almost 0 ppm or about 0.5 ppm even if any dissolved oxygen is present. Therefore, the semi-anaerobic state is maintained in the semi-anaerobic section 13.

The semi-anaerobic state is maintained by adjusting the quantity of air discharged from the air diffusing pipe 15B and/or the quantity of micro/nano bubbles from the micro/nano bubble generator 27, where the air diffusing pipe 15B and the micro/nano bubble generator 27 are placed for cleaning the submerged membrane 16 in the semi-anaerobic section 13. The adjustment allows the semi-anaerobic state to be rather high in dissolved oxygen concentration. Moreover, a flat type membrane or a hollow-fiber type membrane may be adopted for the submerged membrane 16, and both types of the submerged membranes are available in the market. The treated water passing through the submerged membrane 16 naturally flows out, by gravity, from the gravity pipe 17 connected to the submerged membrane 16. The gravity pipe 17 makes the treated water flow out by using water head difference. This allows energy saving operation since electricity is not used. When the quantity of water filtrated by the submerged membrane 16 is decreased, that is to say, when the treated water quantity is decreased, the submerged membrane 16 itself is cleaned by using sodium hypochlorite or the like.

In the first embodiment, generation of micro/nano bubbles allows considerable increase in dissolution efficiency of oxygen in the nitrification tank 11 and considerable reduction in operating time of the nitrification tank blower 30. Thereby, it becomes possible to achieve energy saving. Particularly, the effect of micro/nano bubbles makes it possible to keep dissolved oxygen at a certain level or more in the aerobic section 12 located on the upper side of the nitrification tank 11 even when the blower 30 for the nitrification tank 11 is intermittently operated.

Second Embodiment

Figure 2:
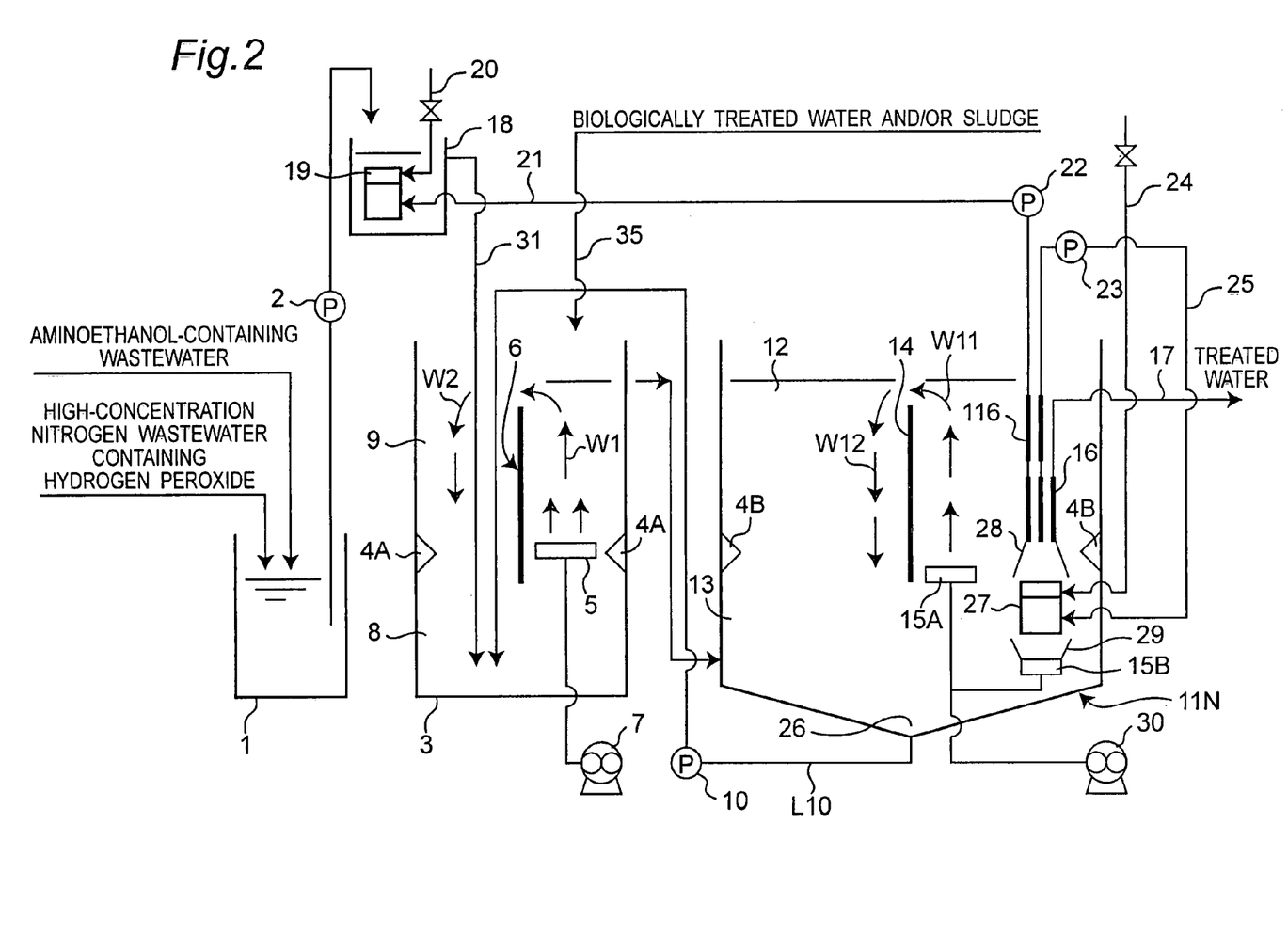
FIG. 2 is a schematic view showing a wastewater treatment device in a second embodiment of the present invention.

FIG. 2 shows a wastewater treatment device in a second embodiment of the present invention. The second embodiment is different from the first embodiment only in the point that a nitrification tank 11N has a second submerged membrane 116 placed above the submerged membrane 16.

In the second embodiment, the submerged membranes 16 and 116 are placed vertically in two stages whereas, in the first embodiment, the submerged membrane 16 is placed horizontally in a single stage. Consequently, in the second embodiment, the second submerged membrane 116 is cleaned with reuse of air necessary for the lower submerged membrane 16 in the nitrification tank 11N. This allows considerable reduction in air quantity necessary for cleaning. Moreover, in the nitrification tank 11N, a plurality of the submerged membranes 16, 116 are placed vertically in two stages. This allows reduction in installation floor area of the nitrification tank 11N and makes it possible to provide a space-saving device. In other words, the second embodiment has an advantage that micro/nano bubbles and cleaning air, which ascend from the lower side of the submerged membrane 16, are effectively used because the submerged membranes 16, 116 are vertically placed in two stages. Although the submerged membrane in two-stage configuration has been provided in the second embodiment, it is acceptable to provide a submerged membrane placed vertically in three or more stages.

Third Embodiment

Figure 3:
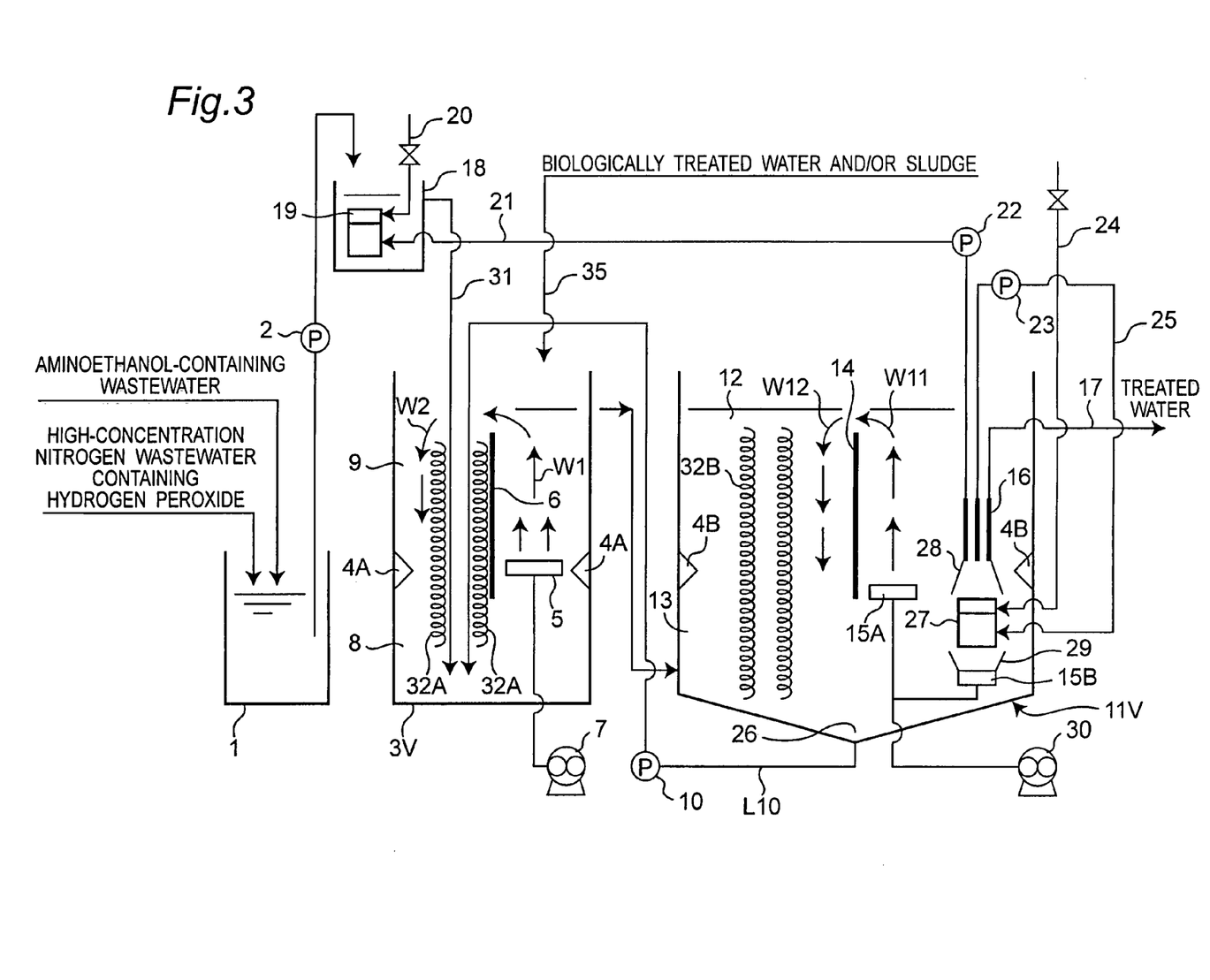
FIG. 3 is a schematic view showing a wastewater treatment device in a third embodiment of the present invention.

FIG. 3 shows a wastewater treatment device in a third embodiment of the present invention. The third embodiment is different from the first embodiment only in the point that a denitrification tank 3V and a nitrification tank 11V are provided with vinylidene chloride fillings 32A, 32B respectively. In the first embodiment, the denitrification tank 3 and the nitrification tank 11 are not provided with any filling. Accordingly, in the third embodiment, the component parts identical to those in the first embodiment are denoted by identical reference numerals, and descriptions thereof are omitted except the component parts different from the first embodiment.

In the third embodiment, the vinylidene chloride filling 32A is provided in an area of two areas divided by a divider plate 6 within the denitrification tank 3V, in which area an air diffusing pipe 5 is not placed. In addition, the vinylidene chloride filling 32B is provided in an area of two areas divided by a divider plate 14 within the nitrification tank 11V, in which area an air diffusing pipe 15A is not placed.

In the third embodiment, the vinylidene chloride fillings 32A, 32B make it possible to entirely increase microbe concentrations in the denitrification tank 3V and the nitrification tank 11V, respectively. In addition, the vinylidene chloride fillings 32A, 32B allow microbes to be attached thereto and bred thereon, and make it possible to achieve stabilization of the microbes and to increase the treatment capability of nitrogen in high concentration nitrogen wastewater. Thus, the nitrogen treatment efficiency is increased in high concentration nitrogen wastewater which contains hydrogen peroxide. It is to be noted that overall placement of the vinylidene chloride fillings 32A, 32B in the tanks 3V, 11V leads to overall increase in the microbe concentration in the respective tanks.

In this wastewater treatment device, microbes breed on the vinylidene chloride fillings 32A, 32B as time proceeds starting from a test run. Consequently, the microbe concentrations on the surface of the vinylidene chloride fillings 32A, 32B become 30000 ppm or more. Thereby, treatment efficiency of nitrogen is increased. The fillings 32A, 32B are made of vinylidene chloride which is strong and resistant to chemical substances, so that the fillings 32A, 32B can be semi-permanently used. Products having the names of Biocode, Ling-Lace, BioMultiLeaf and BIOmodule are available for the vinylidene chloride fillings 32A, 32B. On the basis of the properties of wastewater, one product may be selected from among the above-stated products. In an aerobic section 12 in the nitrification tank 11V, ammonium-nitrogen in treated water is oxidatively dissolved by aerobic microbes and turned into nitrate-nitrogen or nitrite-nitrogen.

It is acceptable to combine the vinylidene chloride fillings 32A, 32B in the third embodiment with the submerged membranes 16, 116 vertically placed in two stages in the second embodiment.

Fourth Embodiment

Figure 4:
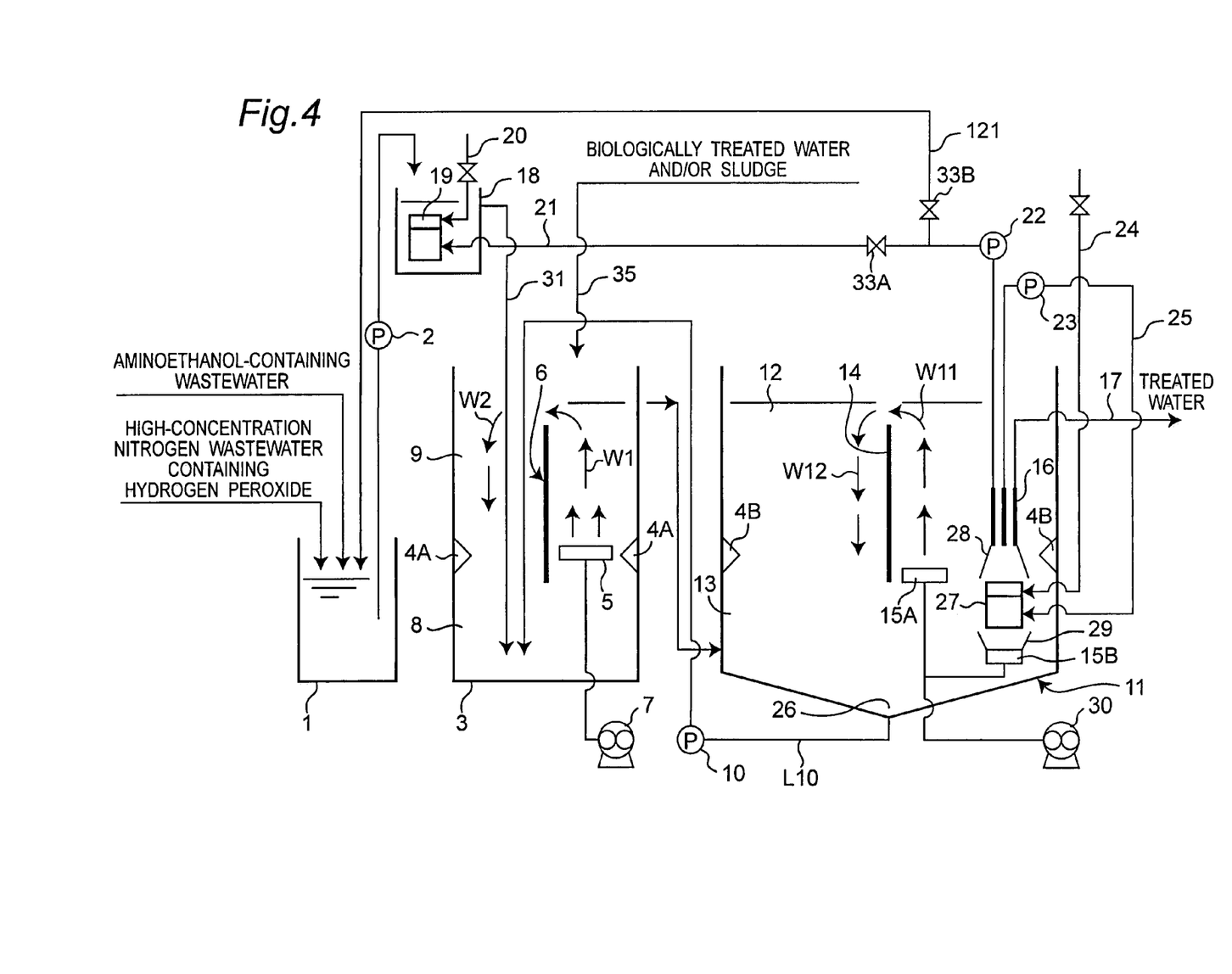
FIG. 4 is a schematic view showing a wastewater treatment device in a fourth embodiment of the present invention.

FIG. 4 shows a wastewater treatment device in a fourth embodiment of the present invention. In the fourth embodiment, the feed section is provided with a feed pipe 121 besides the feed pump 22 and the feed pipe 21, and provided with a valve 33A on the feed pipe 21 and a valve 33B on the feed pipe 121. The feed pipe 121 diverges from the feed pipe 21 connected to the feed pump 22 and extends to the upper portion of an adjustment tank 1. The fourth embodiment is different from the first embodiment only in the above-stated points. Therefore, in the fourth embodiment, the component parts identical to those in the first embodiment are denoted by identical reference numeral, and description will be omitted except the component parts different from the first embodiment.

In the fourth embodiment, two feed routes are provided to feed treated water from the feed pump 22 to a micro/nano bubble generator 19 and an adjustment tank 1 through two feed pipes 12 and 121 respectively, whereas in the first embodiment, one feed route is provided to feed treated water from the feed pump 22 to the micro/nano bubble generator 19. In the fourth embodiment, therefore, treated water in an aerobic section 12 of a nitrification tank 11 is introduced into the adjustment tank 1 by using the feed pump 22, so that the first treatment starting from the adjustment tank 1 is repeated again. This repeated treatment enhances the quality of treated water. More particularly, to enhance the quality of treated water by repeating the treatment, a part of the treated water in the aerobic section 12 of the subsequent nitrification tank 11 is returned again to the adjustment tank 1 and a micro/nano bubble reaction tank 18, and finally to the denitrification tank 3.

The valves 33A and 33B adjusts the quantity of wastewater introduced from the feed pump 22 to the micro/nano bubble generator 19 and the adjustment tank 1.

The two feed routes by two feed pipes 12 and 121 in the fourth embodiment may be combined with the third embodiment or the second embodiment.

EXAMPLE OF EXPERIMENT

An experimental device was produced which has a configuration identical to that of the wastewater treatment device in the first embodiment shown in FIG. 1. In the experimental device, the capacity of the adjustment tank 1 was 50 liter, the capacity of the micro/nano bubble reaction tank 18 was 20 liter, the capacity of the denitrification tank 3 was 100 liter, and the capacity of the nitrification tank 11 was 200 liter. In this experimental device, microbes are cultured for two months to have a microbe concentration of 23000 ppm. Thereafter, high concentration nitrogen wastewater containing hydrogen peroxide with a nitrogen concentration of 3380 ppm discharged from manufacturing equipment in a plant was continuously introduced into the adjustment tank 1 together with aminoethanol-containing wastewater. Biologically treated sludge is introduced into the denitrification tank 3. The water quality was stabilized after the elapse of one month. Then, the nitrogen concentration was measured in the outlet port of the gravity pipe 17. The measurement result of nitrogen concentration was 7 ppm.

Figure 5A:
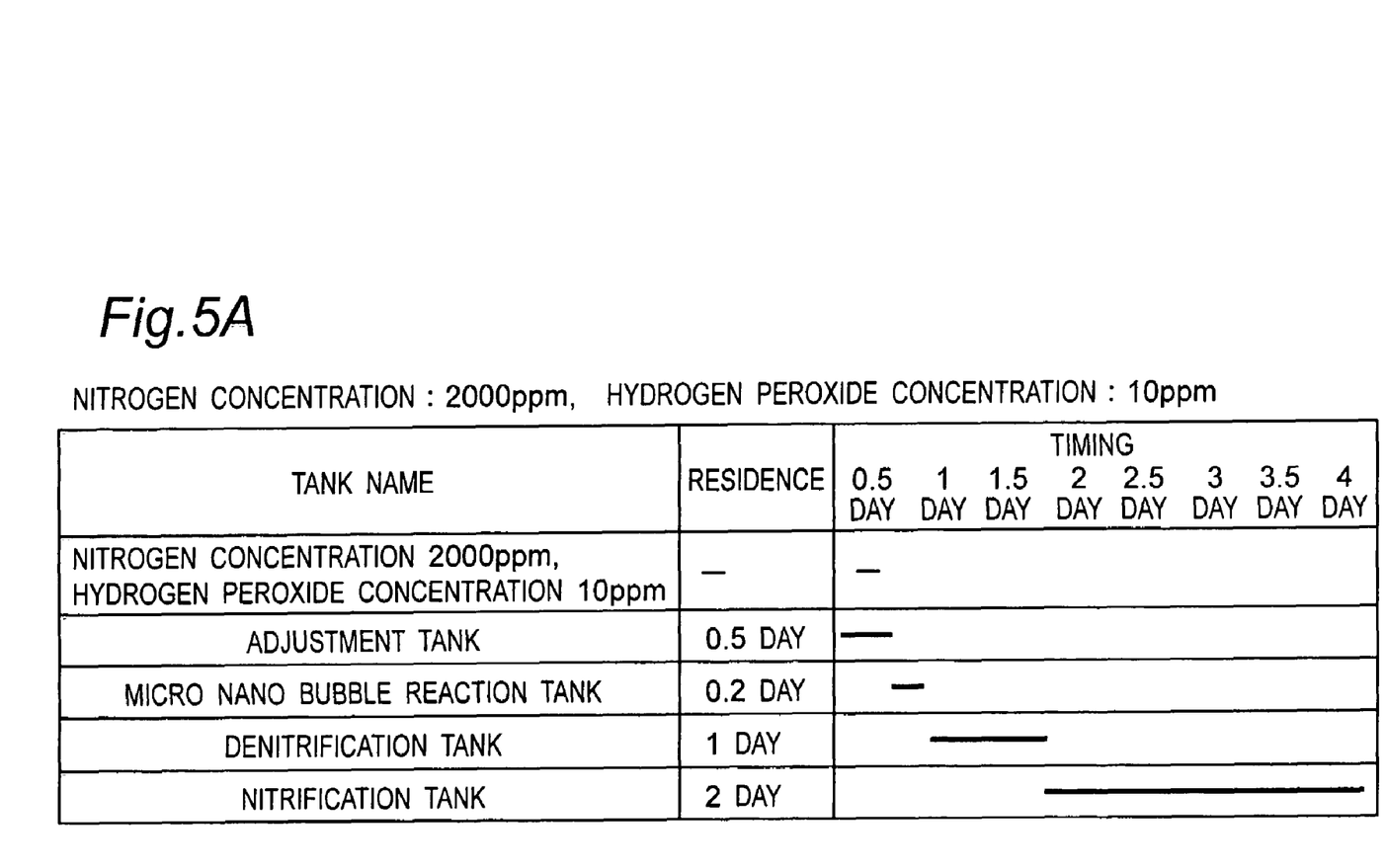
FIG. 5A is an example of a timing chart in the case where nitrogen concentration of nitrogen wastewater in the first to fourth embodiments is 2000 ppm and a concentration of hydrogen peroxide is 10 ppm.
Figure 5B:
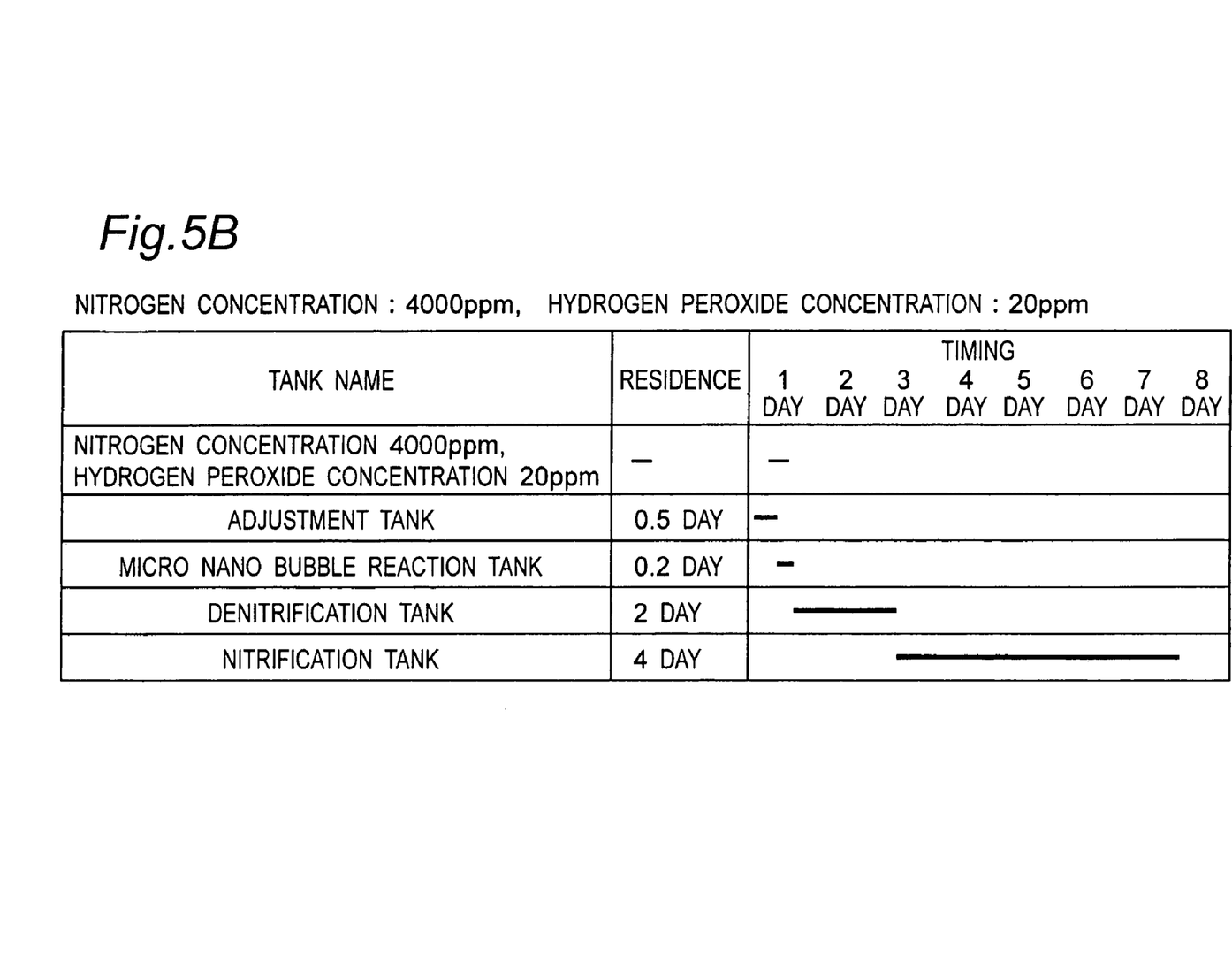
FIG. 5B is an example of a timing chart in the case where a nitrogen concentration of nitrogen wastewater in the first to fourth embodiments is 4000 ppm and a concentration of hydrogen peroxide is 20 ppm.

FIG. 5A shows an example of a timing chart showing residence time of treated water in each tank in the first to fourth embodiments in the case where high concentration nitrogen wastewater containing hydrogen peroxide has a nitrogen concentration of 2000 ppm and a hydrogen peroxide concentration of 10 ppm. FIG. 5B shows an example of a timing chart showing residence time of treated water in each tank in the first to fourth embodiments in the case where high concentration nitrogen wastewater containing hydrogen peroxide has a nitrogen concentration of 4000 ppm and a hydrogen peroxide concentration of 20 ppm.

The invention being thus described, it will be obvious that the invention may be varied in many ways. Such variations are not be regarded as a departure from the spirit and scope of the invention, and all such modifications as would be obvious to one skilled in the art are intended to be included within the scope of the following claims.

The invention claimed is:

1. A wastewater treatment device, comprising:
 a micro/nano bubble reaction tank comprising a micro/nano bubble generator and means for receiving nitrogen wastewater containing hydrogen peroxide wherein micro/nano bubbles generated by the generator comprise air and are contacted with the nitrogen wastewater for treating the nitrogen wastewater;

a denitrification tank for receiving treated water from the micro/nano bubble reaction tank; and a nitrification tank for receiving treated water from the denitrification tank and applying microbial treatment to the treated water with use of a submerged membrane provided in the nitrification tank.

2. The wastewater treatment device according to claim 1, further comprising an adjustment tank placed before the micro/nano bubble reaction tank, receiving the nitrogen wastewater, and adjusting quality and quantity of the nitrogen wastewater, wherein the micro/nano bubble reaction tank receives nitrogen wastewater whose quality and quantity are adjusted in the adjustment tank.

3. The wastewater treatment device according to claim 1, wherein the micro/nano bubble reaction tank further comprises a feed section for feeding treated water attained from the nitrification tank through the submerged membrane to the micro/nano bubble generator.

4. The wastewater treatment device according to claim 1, wherein the nitrification tank has a micro/nano bubble cleaning section for generating micro/nano bubbles to clean the submerged membrane.

5. The wastewater treatment device according to claim 4, wherein the nitrification tank has an air diffusing pipe for discharging air to the submerged membrane to clean the submerged membrane, and the submerged membrane is cleaned with mixed bubbles composed of micro/nano bubbles generated by the micro/nano bubble cleaning section and air discharged from the air diffusing pipe.

6. The wastewater treatment device according to claim 5, wherein the air diffusing pipe is placed below the submerged membrane while the micro/nano bubble cleaning section is placed between the submerged membrane and the air diffusing pipe, a first guide is mounted on the air diffusing pipe and guiding air discharged from the air diffusing pipe to the micro/nano bubble cleaning section; and a second guide is mounted on the submerged membrane and guiding micro/nano bubbles generated by the micro/nano bubble cleaning section and air discharged from the air diffusing pipe to the submerged membrane.

7. The wastewater treatment device according to claim 5, wherein the nitrification tank has a plurality of submerged membranes placed vertically in two or more stages.

8. The wastewater treatment device according to claim 1, wherein the micro/nano bubble reaction tank receives mixed wastewater composed of the nitrogen wastewater and aminoethanol-containing wastewater.

9. A wastewater treatment device comprising:
a micro/nano bubble reaction tank comprising a micro/nano bubble generator and means for receiving nitrogen wastewater containing hydrogen peroxide wherein micro/nano bubbles generated by the generator are contacted with the nitrogen wastewater for treating the nitrogen wastewater;
a denitrification tank for receiving treated water from the micro/nano bubble reaction tank; and
a nitrification tank for receiving treated water from the denitrification tank and applying microbial treatment to the treated water with use of a submerged membrane provided in the nitrification tank,
wherein the denitrification tank has an upper section, a lower section, a separation wall placed between the upper section and the lower section, a divider plate extending in vertical direction, and an air diffusing pipe placed between the divider plate and the separation wall, and the nitrification tank has an upper section, a lower section, a separation wall placed between the upper section and the lower section, a divider plate extending in vertical direction, and an air diffusing pipe placed between the divider plate and the separation wall.

10. The wastewater treatment device according to claim 1, wherein the denitrification tank receives treated water subjected to biological treatment and/or sludge generated after biological treatment.

11. The wastewater treatment device according to claim 1, wherein a microbe concentration in the nitrification tank is 15000 ppm or more in mixed liquor suspended solid concentration.

12. A wastewater treatment device, comprising:
a micro/nano bubble reaction tank comprising a micro/nano bubble generator and means for receiving nitrogen wastewater containing hydrogen peroxide wherein micro/nano bubbles generated by the generator are contacted with the nitrogen wastewater for treating the nitrogen wastewater;
a denitrification tank for receiving treated water from the micro/nano bubble reaction tank; and
a nitrification tank for receiving treated water from the denitrification tank and applying microbial treatment to the treated water with use of a submerged membrane provided in the nitrification tank, the nitrification tank further comprising
a micro/nano bubble cleaning section for generating micro/nano bubbles to clean the submerged membrane,
an air diffusing pipe for discharging air to the submerged membrane to clean the submerged membrane, and the submerged membrane is cleaned with mixed bubbles composed of micro/nano bubbles generated by the micro/nano bubble cleaning section and air discharged from the air diffusing pipe, wherein the air diffusing pipe is placed below the submerged membrane while the micro/nano bubble cleaning section is placed between the submerged membrane and the air diffusing pipe, a first guide is mounted on the air diffusing pipe and guiding air discharged from the air diffusing pipe to the micro/nano bubble cleaning section; and a second guide is mounted on the submerged membrane and guiding micro/nano bubbles generated by the micro/nano bubble cleaning section and air discharged from the air diffusing pipe to the submerged membrane.

13. The wastewater treatment device according to claim 12, further comprising an adjustment tank placed before the micro/nano bubble reaction tank, receiving the nitrogen wastewater, and adjusting quality and quantity of the nitrogen wastewater, wherein the micro/nano bubble reaction tank receives nitrogen wastewater whose quality and quantity are adjusted in the adjustment tank.

14. The wastewater treatment device according to claim 1, wherein the micro/nano bubble reaction tank further comprises a feed section for feeding treated water attained from the nitrification tank through the submerged membrane to the micro/nano bubble generator.

* * * * *